(12) United States Patent
Miller (10) Patent No.: US 8,611,506 B2
(45) Date of Patent: Dec. 17, 2013

(54) METHODS AND APPARATUS TO FACILITATE VOICEMAIL INTERACTION

(75) Inventor: Jon S. Miller, Cooper City, FL (US)

(73) Assignee: BlackBerry Limited, Waterloo (CA)

( * ) Notice: Subject to any disclaimer, the term of this patent is extended or adjusted under 35 U.S.C. 154(b) by 19 days.

(21) Appl. No.: 13/178,796

(22) Filed: Jul. 8, 2011

(65) Prior Publication Data

US 2013/0010934 A1    Jan. 10, 2013

(51) Int. Cl.
*H04M 1/64* (2006.01)

(52) U.S. Cl.
USPC ............................. 379/88.01; 379/88.11

(58) Field of Classification Search
USPC ................. 379/88.01, 88.14, 90.01; 455/413, 455/414.1, 566
See application file for complete search history.

(56) References Cited

U.S. PATENT DOCUMENTS

| | | | |
|---|---|---|---|
| 5,283,818 A | 2/1994 | Klausner et al. | |
| 5,572,576 A | 11/1996 | Klausner et al. | |
| 6,009,469 A | 12/1999 | Mattaway et al. | |
| 6,088,717 A | 7/2000 | Reed et al. | |
| 6,192,118 B1 | 2/2001 | Bayless et al. | |
| 6,498,791 B2 | 12/2002 | Pickett et al. | |
| 6,675,204 B2 | 1/2004 | De Boor et al. | |
| 7,277,951 B2 | 10/2007 | Marriott et al. | |
| 7,330,538 B2 | 2/2008 | Dunsmuir | |
| 7,532,913 B2 * | 5/2009 | Doulton ..................... 455/566 |
| 2003/0128820 A1 * | 7/2003 | Hirschberg et al. ......... 379/88.14 |
| 2004/0120479 A1 | 6/2004 | Creamer et al. | |
| 2005/0059384 A1 * | 3/2005 | Kuusinen et al. .......... 455/414.1 |
| 2006/0029193 A1 | 2/2006 | Timmins et al. | |
| 2008/0049916 A1 * | 2/2008 | Tsai ........................... 379/90.01 |
| 2008/0207176 A1 * | 8/2008 | Brackbill et al. ............ 455/413 |
| 2009/0074159 A1 | 3/2009 | Goldfarb et al. | |
| 2011/0014952 A1 * | 1/2011 | Minton ........................ 455/566 |
| 2011/0064206 A1 | 3/2011 | Karnalkar et al. | |
| 2011/0081006 A1 | 4/2011 | Hao et al. | |
| 2011/0098022 A1 | 4/2011 | Shaw et al. | |

FOREIGN PATENT DOCUMENTS

EP    1 109 390 A2    6/2001

OTHER PUBLICATIONS

"How Fusion Voicemail Plus Works," 2009, [retrieved from http://www.fusionvoicemailplus.com/marketing/how.html] 2 pages.
European Patent Office, "Extended European Search Report," issued in connection with EP Application No. 11173286.3, dated Dec. 6, 2011, (7 pages).

\* cited by examiner

*Primary Examiner* — Fan Tsang
*Assistant Examiner* — Van D Huynh
(74) *Attorney, Agent, or Firm* — Steven M. Greenberg, Esq.; Carey, Rodriguez, Greenberg & O'Keefe (57) ABSTRACT

Example methods and apparatus to facilitate voicemail interaction are disclosed. A disclosed example method involves, during a call session with a voicemail system, receiving an audio segment from the voicemail system. The example method also involves performing feature recognition on the audio segment and outputting a display element to a user interface based on a recognized feature in the audio segment.

17 Claims, 8 Drawing Sheets

FIG. 1

SPEECH RECOGNITION
FIG. 4

AFFIXED INFORMATION
FIG. 5

EMBEDDED INFORMATION
FIG. 6

METHODS AND APPARATUS TO FACILITATE VOICEMAIL INTERACTION

FIELD OF THE DISCLOSURE

The present disclosure relates generally to communication devices and, more particularly, to methods and apparatus to facilitate voicemail interaction.

BACKGROUND

Voicemail systems enable users to receive voicemail messages at a remote voicemail system location and retrieve those voicemail messages via one or more devices. That is, if a person is unable or unwilling to answer a telephone call, a voicemail system enables the telephone call to be answered by a voicemail service that permits a calling party to leave a voicemail message for the person or the called party. Subsequently, the called party may contact the voicemail service to access a corresponding voicemail account and listen to the voicemail message left by the calling party. Voicemail systems are often implemented using interactive voice response (IVR) systems in which users listen to instructions for navigating through the voicemail systems.

DETAILED DESCRIPTION

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

It will be appreciated that, for simplicity and clarity of illustration, where considered appropriate, reference numerals may be repeated among the figures to indicate corresponding or analogous elements. In addition, numerous specific details are set forth in order to provide a thorough understanding of examples disclosed herein. However, it will be understood by those of ordinary skill in the art that examples disclosed herein may be practiced without these specific details. In other instances, well-known methods, procedures and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones (e.g., BlackBerry® smart phones), cellular telephones, wireless personal digital assistants (PDA), tablet/laptop/notebook/netbook computers with wireless adapters, etc.

In some examples, disclosed example methods, apparatus, and articles of manufacture may be implemented in connection with other types of telecommunication devices such as plain old telephone service (POTS)-based landline telephones, voice over internet protocol (VoIP) telephones, etc.

Traditional IVR voicemail system interactions involve prompts, notifications, and/or confirmations that are sent to users via audio only, requiring that a user device (e.g., a telephone) be held to a person's ear, be in speaker-phone mode, or be attached to a headset worn by a user of the device. When the user device is not in speaker-phone mode or is not attached to a headset worn by a user of the device, the user must put the user device to his/her ear to listen to audio prompts, move the user device away from his/her ear to press a key for a desired action (e.g., delete, save, forward, send, skip, create, etc. a voicemail message), and move the user device back to his/her ear to listen for an audio notification or confirmation that the desired action has occurred. Such back and forth movement between a user's ear and the user's view of the user device can be time consuming, tedious, and cumbersome when navigating a voicemail call session. For example, such back and forth movement introduces discontinuities in a user's visual focus on a user device keypad or touch-screen display such that each time a user moves the user device back into viewing position, the user must refocus and re-orient his/her sight on the user device keypad or touch-screen display. Similarly, each time the user moves the user device back to his/her ear, the user must re-position the device for optimal comfort and hearing.

Another drawback of traditional IVR voicemail system interactions is the significant reliance on a user's ability to hear audio information (e.g., prompts, notifications, confirmations, etc.) and also remember such audio information during a voicemail call session. For example, if a user is in a voicemail call session while in a noisy environment, the user may not be able to correctly hear all voicemail system prompts or may be distracted such that the user becomes confused as to which keys to press for different features or operations (e.g., delete, save, forward, send, skip, create, etc. a voicemail message). This can be particularly frustrating and potentially risky if a person confuses a numeric key for a delete operation with a numeric key for a save operation. In such an instance, if the person intends to save an important voicemail message, the person may inadvertently delete the voicemail message by pressing the numeric key corresponding to a delete operation when the person mistakenly thought it corresponded to a save operation. In addition, if the person does not move the user device back to his/her ear or does move the user device back to his/her ear but is in a noisy environment, the person may not hear the audio confirmation that the message has been deleted rather than saved.

Example methods, apparatus, and articles of manufacture disclosed herein facilitate voicemail interactions between users and interactive voice response (IVR) voicemail systems during voicemail call sessions in which users listen to voicemail messages from other persons or create/send voicemail messages to other persons. In particular, unlike traditional IVR voicemail system interactions in which users are informed of prompts, notifications, and/or confirmations via audio only and in which a user device must be held to a person's ear, must be in speaker-phone mode, or must be attached to a headset worn by the person, examples disclosed herein enable conducting voicemail system interactions using visual information displayed on a user device (e.g., a mobile telephone, a landline telephone, a VoIP telephone, etc.). Such visual information may be visual cues such as user interface input/control prompts (e.g., a delete message control, a save message control, a forward message control, a send message control, a skip message control, etc.) and/or notifications such as confirmations of completed user requests (e.g., confirmations of deleted messages, saved messages, forwarded messages, sent messages, skipped messages, etc.), requests for user-initiation of user-requested operations (e.g., confirm user-selection to initiate message deletion, confirm user-selection to initiate saving of message, confirm user-selection to initiate forwarding of message, confirm user-selection to initiate skipping of message, confirm user-selection to initiate ending of voicemail session, etc.), and voicemail account status information (e.g., a quantity of new messages, a quantity of saved messages, a quantity of storage space remaining, etc.).

A disclosed example method to facilitate voicemail interaction involves, during a call session with a voicemail system, receiving an audio segment from the voicemail system. A feature recognition operation is then performed on the audio segment and a display element or display information is output to a user interface of a user device (e.g., a mobile telephone, a landline telephone, a VoIP telephone, etc.) for display based on a recognized feature in the audio segment.

In some examples, during a voicemail call session, a connected user device displays visual information based on device-recognizable information or features received in audio communications from a voicemail system. For example, such device-recognizable information may be human-perceptible automated voice-recorded prompts that are sent by IVR voicemail systems and are speech-recognizable by receiving user devices. Additionally or alternatively, audio communications sent by voicemail systems in accordance with examples disclosed herein may include affixed information that is imperceptible or substantially imperceptible to humans. Such human-imperceptible affixed information may be affixed to the beginning (e.g., pre-fixed information), the middle (e.g., infixed information), the end (e.g., suffixed or post-fixed information), the beginning and end (e.g., circumfixed information), and/or interleaved through one or more portions (e.g., transfixed information) of human-perceptible audio and are structured, configured, or otherwise intended to be recognizable by receiving devices to trigger, prompt, or otherwise cause the receiving devices to display corresponding information. Additionally or alternatively, audio communications sent by voicemail systems in accordance with examples disclosed herein may include embedded information that is imperceptible or substantially imperceptible to humans. Such human-imperceptible embedded information may be embedded in human-perceptible audio and is structured, configured, or otherwise intended to be recognizable by receiving devices to trigger, prompt, or otherwise cause the receiving devices to display corresponding information. In other examples, other techniques may be used to cause receiving devices to display voicemail interaction information for viewing by users while interacting with voicemail systems during voicemail call sessions.

Figure 1:
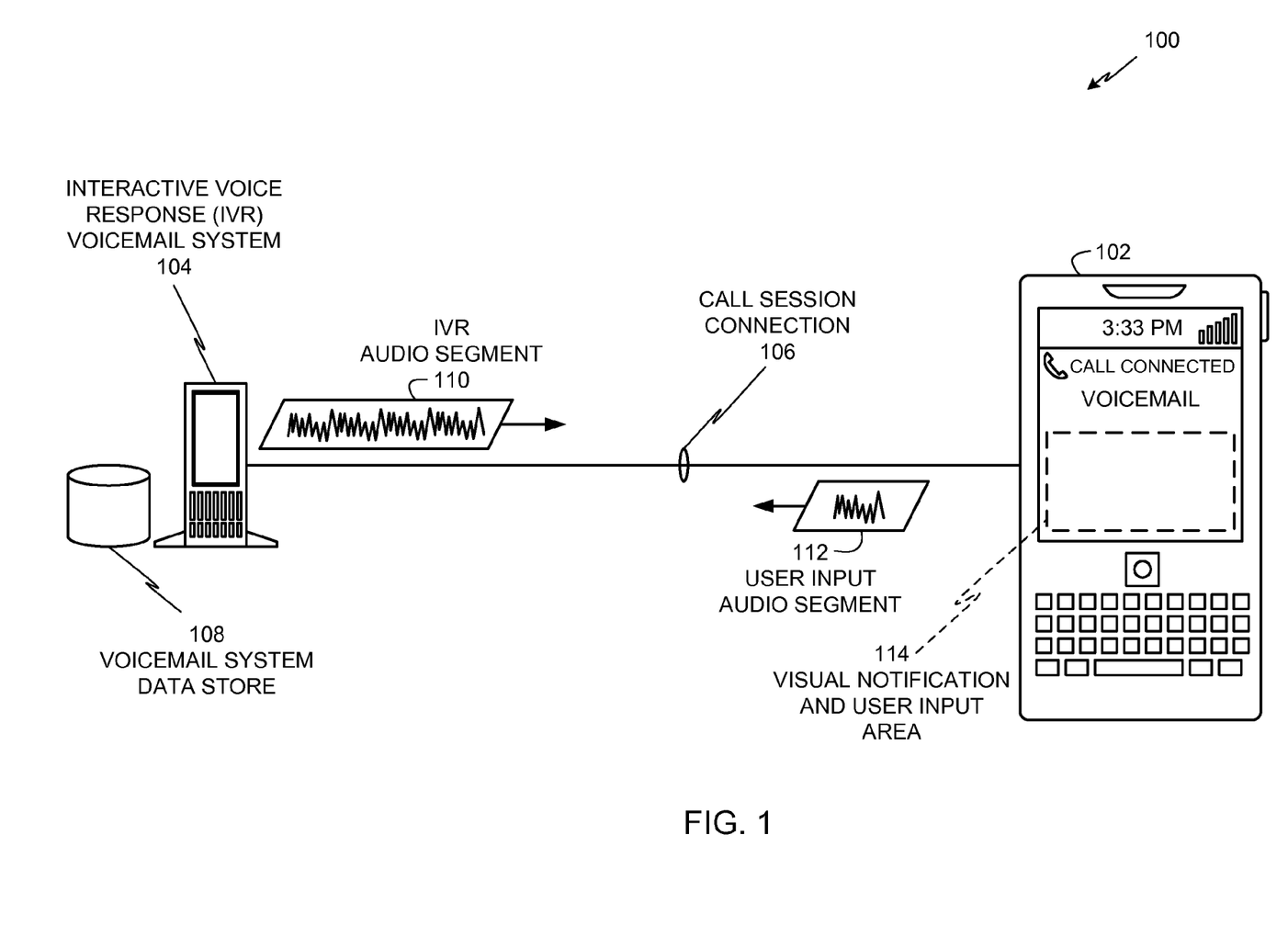
FIG. 1 depicts an example voicemail call session in which a user device is in communication with an interactive voice response (IVR) voicemail system.

FIG. 1 depicts an example voicemail call session 100 in which a user device 102 is in communication with an IVR voicemail system 104. The user device 102 of the illustrated example is a mobile telephone. However, the user device 102 may be implemented using any other type of user device as discussed above. In the illustrated example, the user device 102 is connected to the IVR voicemail system 104 via a call session connection 106. The call session connection 106 of the illustrated example is a voice connection or a connection suitable for exchanging voice communications and may be established using any suitable type of telecommunication connection including, for example, a packet switched connection or a circuit switched connection. In addition, the call session connection 106 may be implemented using a POTS connection, a wireless cellular connection, a VoIP connection, a public switched telephone network (PSTN) connection, a public land mobile network (PLMN) connection, and/or any other type of connection, and/or any combination thereof.

In the illustrated example, the IVR voicemail system 104 includes or is connected to one or more databases or data stores, one of which is shown as an example voicemail system data store 108. The example voicemail system data store 108 stores pre-recorded IVR voice prompts, voice notifications, voice confirmations, voice status information, etc. that are communicated to user devices during voicemail call sessions to enable users to interact with the IVR voicemail system 104. In addition, the voicemail system data store 108 also stores voicemail messages for different user accounts.

The IVR voicemail system 104 of the illustrated example communicates with the user device 102 using audio communications. In the illustrated example, the IVR voicemail system 104 is shown sending an IVR audio segment 110 to the user device 102 via the call session connection 106, and the user device 102 is shown sending a user input audio segment 112 to the IVR voicemail system 104 via the call session connection 106. The IVR audio segment 110 may communicate a user prompt soliciting user input, a notification, a confirmation, voicemail account status information, etc. In the illustrated example, a user prompt soliciting user input may be an automated voice prompt informing a user of numerical keys to press for different operations such as 'listen to a message', 'delete a message', 'save a message', 'forward a message', 'send a message', 'skip a message', 'create a message', etc. In the illustrated example, a voicemail account status notification communicated in the IVR audio segment 110 may be, for example, information notifying a user of a state of the user's voicemail account such as quantities of new messages or saved messages and/or remaining storage space. In the illustrated example, a confirmation communicated in the IVR audio segment 110 may be an automated confirmatory voice response indicating that a user's requested operation has been performed such as 'message has been deleted', 'message has been saved', 'message has been forwarded', 'message has been sent', 'message has been skipped', 'begin speaking to create a message', etc.

The user input audio segment 112 of the illustrated example is used to communicate instructions, commands, codes or other information corresponding to operations specified by a user. Such information may be in the form of dual-tone multi-frequency (DTMF) signaling tones (e.g., touch tones) corresponding to hard keys or soft keys pressed or selected by a user. Additionally or alternatively, such information may be sent in the form of alphanumeric codes or symbols coded, modulated, or otherwise embedded in the user input audio segment 112.

In the illustrated example, the user device 102 and the IVR voicemail system 104 use error prevention and correction techniques to reduce or prevent instances of erroneous information from being displayed on the user device 102 and/or reduce or prevent instances of unintended operations from being performed on messages in the IVR voicemail system 104. Such error prevention and correction techniques may be any suitable technique(s) including, for example, forward error correction, hash sequencing, checksum transmissions, ack/nack (i.e., acknowledge/negative-acknowledge) transmissions, etc.

In the illustrated example, the user device 102 includes a visual notification and user input display area 114. The visual notification and user input area 114 of the illustrated example displays information elements such as graphics or text corresponding to information detected in the IVR audio segment 110. For example, the user device 102 may display visual cues such as user interface input/control prompts (e.g., a delete message control, a save message control, a forward message control, a send message control, a skip message control, etc.) and/or notifications such as confirmations of completed user requests (e.g., confirmations of deleted messages, saved messages, forwarded messages, sent messages, skipped messages, etc.) and voicemail account status information (e.g., a quantity of new messages, a quantity of saved messages, a quantity of storage space remaining, etc.). Thus, the user device 102 may use the visual notification and user input area 114 of the illustrated example to display user input controls for selection by users to request the IVR voicemail system 104 to perform desired operations (e.g., delete a message, save a message, forward a message, send a message, skip a message, etc.) as shown in the illustrated example of FIG. 2 or to display information for viewing by a user as shown in the illustrated example of FIG. 3.

Figure 2:
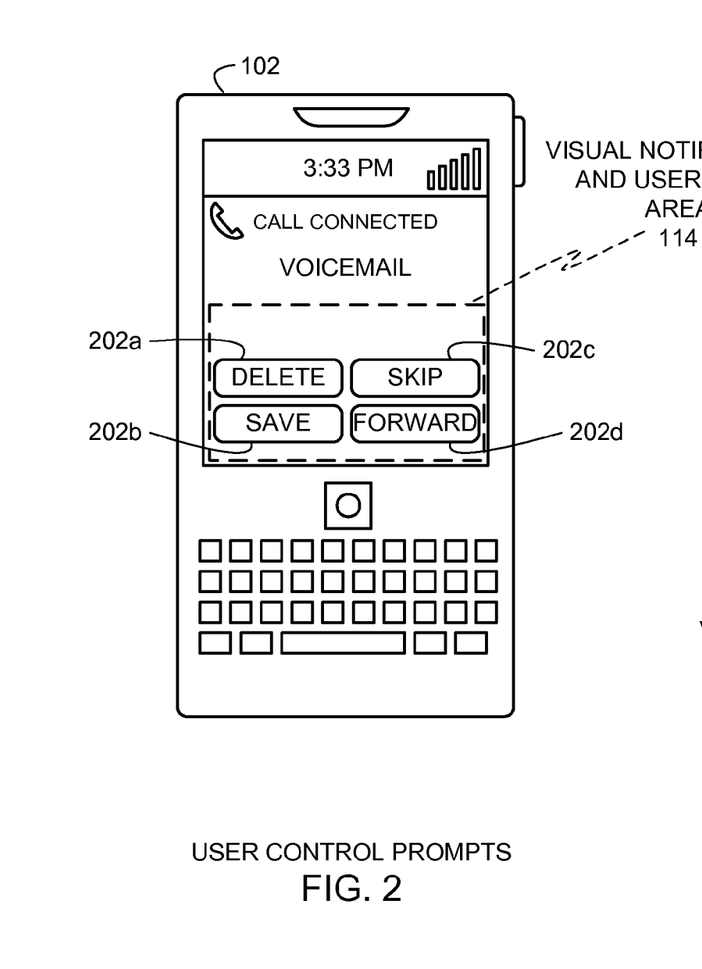
FIG. 2 depicts the example user device of FIG. 1 displaying user control prompts based on information received from the IVR voicemail system of FIG. 1.

Turning to the illustrated example of FIG. 2, the example user device 102 displays user control prompts 202a-d (e.g., user-selectable graphical icons or buttons) in the visual notification and user input area 114 based on information received from the IVR voicemail system 104 via the IVR audio segment 110 of FIG. 1. The user control prompts 202a-d of the illustrated example are display elements or display information that include a delete input control 202a, a save input control 202b, a skip input control 202c, and a forward input control 202d. In other examples, other input controls may additionally or alternatively be displayed. In the illustrated example, when a user selects one or more of the user control prompts 202a-d, the user device 102 sends corresponding information (e.g., an instruction, a command, a code or other information corresponding to an operation specified by the user) to the IVR voicemail system 104 via the user input audio segment 112 of FIG. 1.

Figure 3:
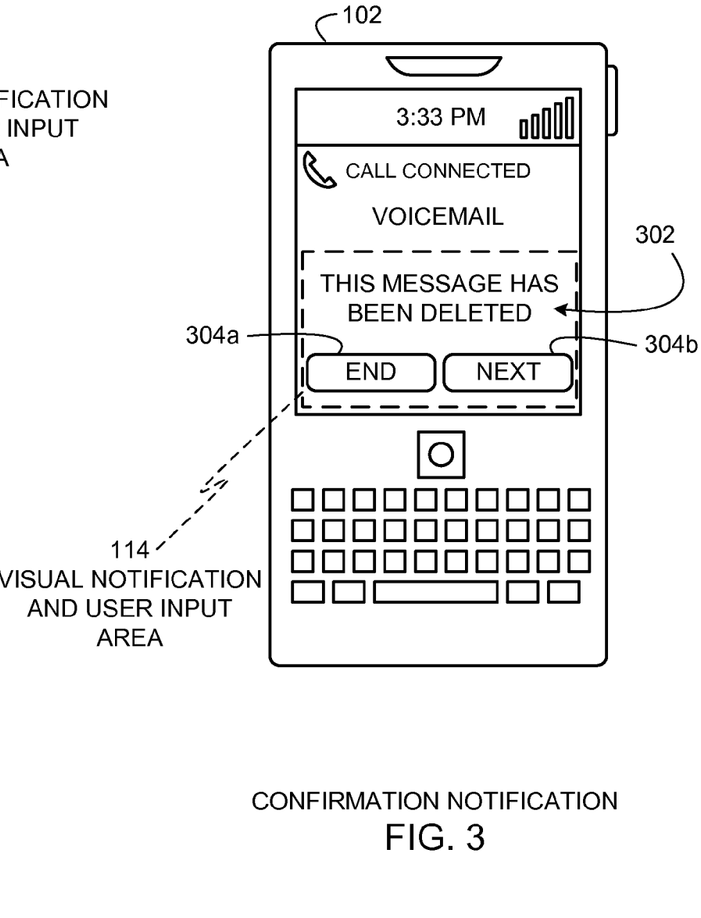
FIG. 3 depicts the example user device of FIG. 1 displaying a visual notification based on information received from the IVR voicemail system of FIG. 1.

The illustrated example of FIG. 3 depicts the example user device 102 displaying a visual notification 302 in the IVR audio segment 110 of FIG. 1 based on information received from the IVR voicemail system 104. In the illustrated example, the visual notification 302 is a confirmation notification ('This message has been deleted') confirming that a message has been deleted. The visual notification 302 is a display element or display information that informs a user via a visual interface that the user's requested operation of deleting a message has been successfully completed. Displaying of the visual notification 302 of the illustrated example allows a user to observe a display (e.g., an example display 810 of FIG. 8) of the user device 102 without needing to move the user device 102 to his/her ear and determine whether a particular message has been deleted based on such visual observation.

In the illustrated example of FIG. 3, the user device 102 also displays display elements or display information including an end control 304a and a next control 304b adjacent the visual notification 302. The end control 304a of the illustrated example enables a user to select to end the voicemail call session 100 of FIG. 1. The next control 304b of the illustrated example enables the user to hear a next voicemail message. In the illustrated example, the user device 102 may display the user control prompts 304a-b based on information communicated in the IVR audio segment 110. Additionally or alternatively, the user device 102 may be configured to always or automatically display the end control 304a and the next control 304b when it detects receipt of information in the IVR audio segment 110 confirming that a message has been deleted.

Figure 4:
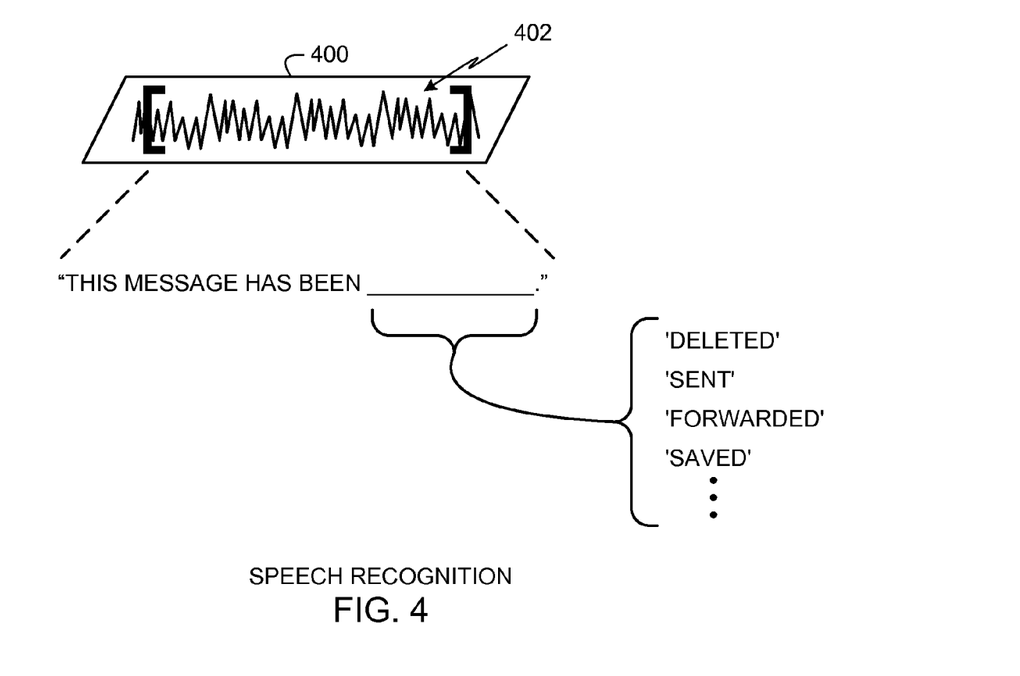
FIG. 4 depicts an example audio segment transmitting a speech signal on which speech recognition may be performed.
Figure 5:
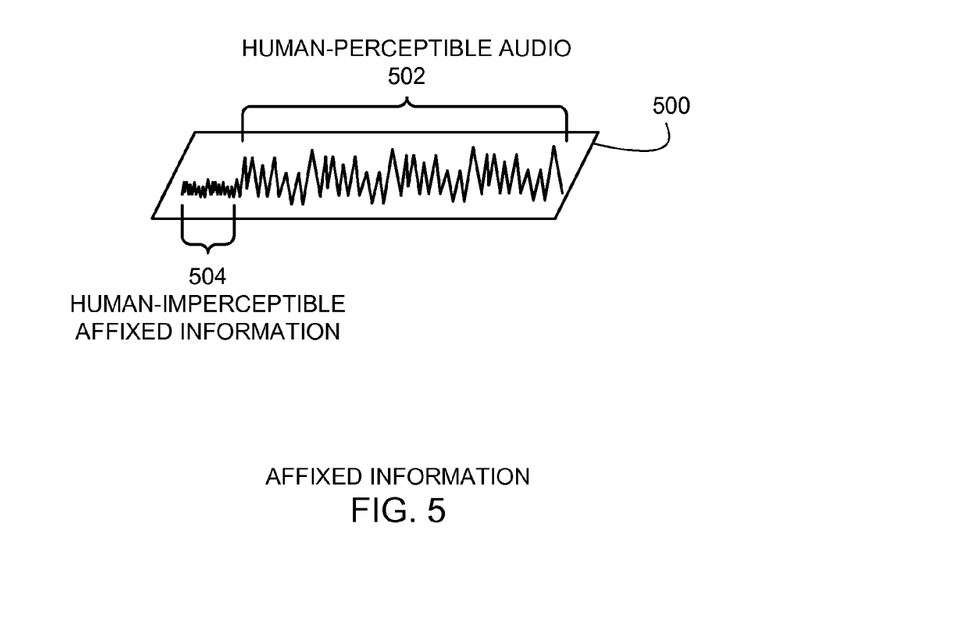
FIG. 5 depicts an example audio segment having a human-perceptible audio portion and a human-imperceptible affixed information portion.
Figure 6:
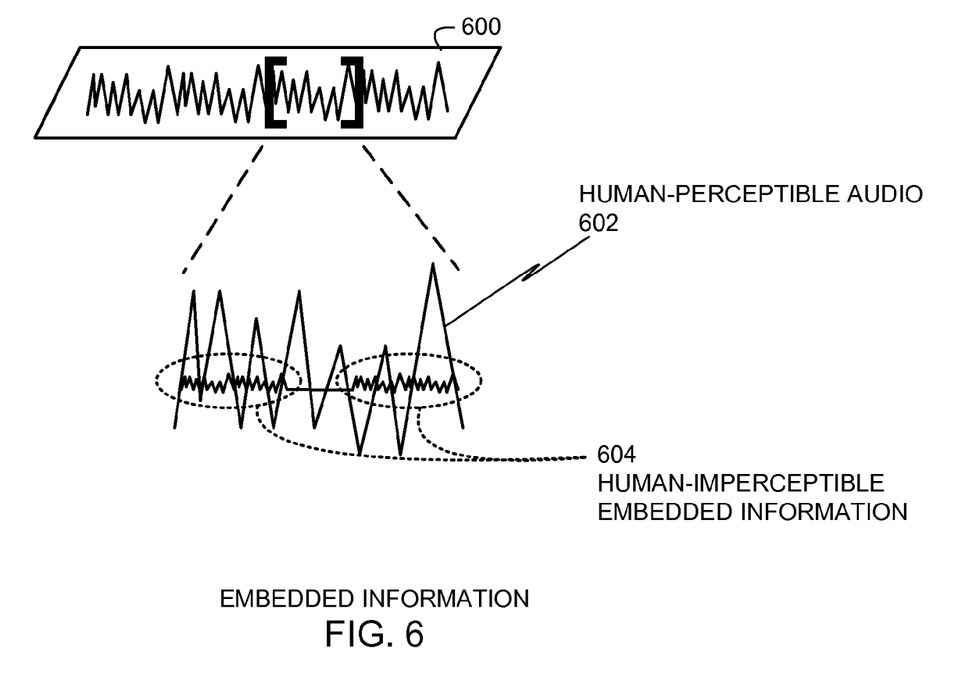
FIG. 6 depicts an example audio segment having a human-perceptible audio portion and human-imperceptible embedded information.

FIGS. 4-6 depict audio segments 400, 500, and 600 carrying information using different types of example techniques for detecting by the user device 102 of FIGS. 1-3 to display corresponding information in the visual notification and user input area 114 of FIGS. 1-3. In the illustrated examples, each of the audio segments 400, 500, and 600 may be used to implement the IVR audio segment 110 of FIG. 1. For example, some IVR voicemail systems and user devices employing example techniques disclosed herein may use a single type of the information conveying techniques shown in one of FIGS. 4-6 or a combination of different types of the information conveying techniques of FIGS. 4-6. Although three example techniques for transmitting information to trigger or cause visual displays in the visual notification and user input area 114 are disclosed, examples disclosed herein may be implemented in connection with other types of information transmission techniques alone or in combination with one or more of the example techniques of FIGS. 4-6 or any other suitable technique(s). Some such other types of information transmission techniques may involve establishing a data connection concurrently with a voice connection between the user device 102 and the IVR voicemail system 104 during the call session connection 106 of FIG. 1 so that the IVR voicemail system 104 may communicate information to the user device 102 via the data connection and send voice information to the user device 102 via the voice connection.

FIG. 4 depicts an example audio segment 400 transmitting a voice portion 402 (e.g., human-perceptible speech) on which the user device 102 may perform speech recognition. For example, the user device 102 in accordance with examples disclosed herein may be provided with speech recognition and text-to-speech conversion capabilities to recognize voiced information (e.g., the voice portion 402) that is otherwise intended to be heard by a user of the user device 102 during a voicemail call session (e.g., the voicemail call session 100 of FIG. 1). In such instances, the example user device 102 performs speech recognition on automated voice-recorded portions or segments (e.g., the voice-recorded portion 402) sent by the IVR voicemail system 104 and displays information in the visual notification and user input area 114 based on the speech-recognized voice portion 402.

In the illustrated example of FIG. 4, in response to recognizing a voiced sentence that starts with 'This message has been,' the user device 102 recognizes that the voice portion 402 is a confirmation that a particular user-selected operation has been successfully performed. In the illustrated example, the user device 102 displays a corresponding confirmation message in the visual notification and user input area 114 based on a recognized keyword following the start of the sentence. Such keywords may be, for example, 'deleted' to indicate that a message delete operation has been successfully performed, 'sent' to indicate that a message send operation has been successfully performed, 'forwarded' to indicate that a message forward operation has been successfully performed, and 'saved' to indicate that a message save operation has been successfully performed. For example, the user device 102 may use a speech-recognition capability to convert some or all of the voice portion 402 to text format and display the recognized voice portion 402 in text format. Additionally or alternatively, the user device 102 can access a database or look-up table locally stored therein to retrieve a pre-defined graphic, user input control, or text string corresponding to the recognized voice portion 402 and display the pre-defined graphic or text string in the visual notification and user input area 114.

FIG. 5 depicts an example audio segment 500 having a human-perceptible audio portion 502 and a human-imperceptible affixed information portion 504. In the illustrated example, the human-perceptible audio portion 502 is voiced information that is intended to be heard by a user of the user device 102 during a voicemail call session (e.g., the voicemail call session 100 of FIG. 1). In the illustrated example of FIG. 5, the human-imperceptible affixed information portion 504 is information that corresponds to the human-perceptible audio portion 502. For example, if the human-perceptible audio portion 502 is a confirmation stating that a message has been deleted, the human-imperceptible affixed information portion 504 includes information corresponding to a deleted message confirmation that causes the user device 102 to display text and/or graphic information in the visual notification and user input area 114 confirming that a message has been deleted.

To generate the human-imperceptible affixed information portion 504, the IVR voicemail system 104 bursts information (e.g., tones, text, codes, symbols, etc.) adjacent to the human-perceptible audio portion 502 and modulates the human-imperceptible affixed information 504 for transmission over voice communications in a manner that prevents or minimizes its detectability or perceptibility by a user. In the illustrated example, by sending the human-imperceptible affixed information portion 504 as a suffix or post-fix following the human-perceptible audio portion 502, the human ear and/or brain is less likely to detect the presence of the human-imperceptible affixed information portion 504 and/or it is easier for the human ear and/or brain to dismiss the human-imperceptible affixed information portion 504 as non-intrusive or non-distracting static, noise, or other sound. Additionally or alternatively, the human-perceptible affixed information 504 may be affixed to the beginning (e.g., prefixed information), the middle (e.g., infixed information), the beginning and end (e.g., circumfixed information), and/or interleaved through one or more portions (e.g., transfixed information) of the human-perceptible audio portion 502.

Although the human-imperceptible affixed information 504 is shown in the illustrated example of FIG. 5 as affixed immediately adjacent to the human-perceptible audio 502, in other examples, the human-imperceptible affixed information 504 may be separated from the human-perceptible audio 502 by intervening silence or other audio or information (e.g., human-perceptible and/or human-imperceptible audio or information). In some examples, the human-imperceptible affixed information 504 is transmitted in another audio segment subsequent to or preceding the example audio segment 500.

For examples in which the IVR audio segment 110 of FIG. 1 is implemented using the example audio segment 500 of FIG. 5, the user device 102 is provided with detection capabilities to detect information in the human-imperceptible affixed information portion 504 that causes the user device 102 to display corresponding information (e.g., graphics and/or text) in the visual notification and user input area 114 of FIGS. 1-3. For example, the detection capabilities may enable the user device 102 to detect information encoded by the IVR voicemail system 104 of FIG. 1 in the human-imperceptible affixed information portion 504 at relatively lower power or volume levels than the human-perceptible audio portion 502 and/or at one or more different frequencies (e.g., sideband frequencies) relative to the human-perceptible audio portion 502.

FIG. 6 depicts an example audio segment 600 having a human-perceptible audio portion 602 and human-imperceptible embedded information 604. In the illustrated example, the human-perceptible audio portion 602 is voiced information that is intended to be heard by a user of the user device 102 during a voicemail call session (e.g., the voicemail call session 100 of FIG. 1). In the illustrated example of FIG. 6, the human-imperceptible embedded information 604 is information that corresponds to the human-perceptible audio portion 602. For example, if the human-perceptible audio portion 602 is a confirmation stating that a message has been deleted, the human-imperceptible embedded information 604 includes information corresponding to a deleted message confirmation that causes the user device 102 to display text and/or graphic information in the visual notification and user input area 114 confirming that a message has been deleted.

To generate the human-imperceptible embedded information 604, the IVR voicemail system 104 embeds, encodes, or otherwise inserts information (e.g., tones, text, codes, symbols, etc.) in the human-perceptible audio portion 602 and modulates the human-imperceptible embedded information 604 for transmission over voice communications in a manner that prevents or minimizes its detectability or perceptibility by a user. In the illustrated example, by embedding, encoding, or otherwise inserting the human-imperceptible embedded information 604 in the audio segment 600, the human ear and/or brain is less likely to detect the presence of the human-imperceptible embedded information 604 and/or it is easier for the human ear and/or brain to dismiss the human-imperceptible information 604 as non-intrusive or non-distracting static, noise, or other sound. For examples in which the IVR audio segment 110 of FIG. 1 is implemented using the example audio segment 600 of FIG. 6, the user device 102 is provided with detection capabilities to detect the human-imperceptible embedded information 604 that causes the user device 102 to display corresponding information (e.g., graphics and/or text) in the visual notification and user input area 114 of FIGS. 1-3.

Figure 7:
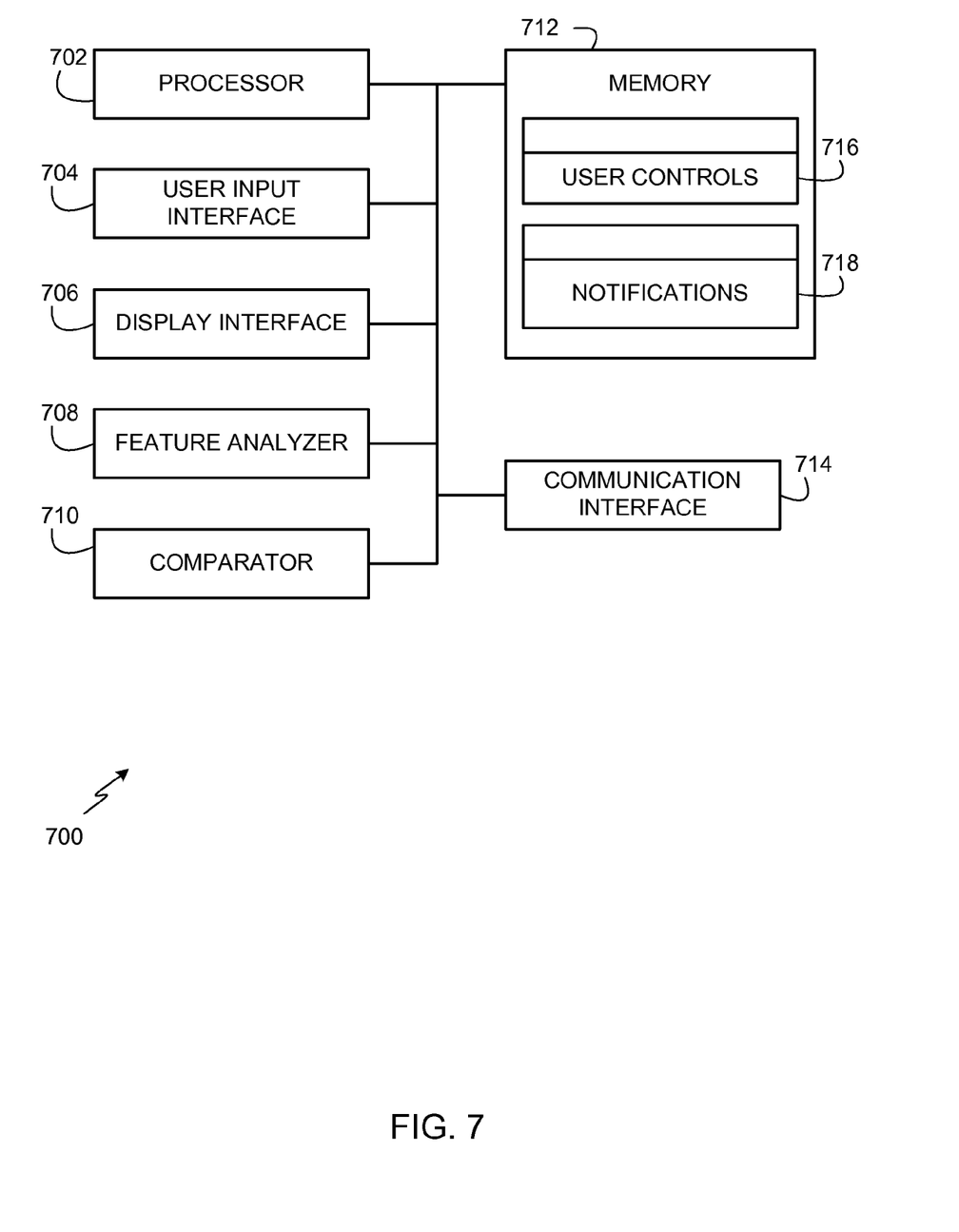
FIG. 7 depicts an example apparatus that may be used to facilitate voicemail interactions by detecting features in transmissions from the IVR voicemail system of FIG. 1.

FIG. 7 depicts an example apparatus 700 that may be used to implement the example user device 102 of FIGS. 1-3. In the illustrated example of FIG. 7, the apparatus 700 is provided with a processor 702, a user input interface 704, a display interface 706, a feature analyzer 708, a comparator 710, a memory 712, and a communication interface 714. The processor 702, the user input interface 704, the display interface 706, the feature analyzer 708, the comparator 710, the memory 712, and/or the communication interface 714 may be implemented using any desired combination of hardware, firmware, and/or software. For example, one or more integrated circuits, discrete semiconductor components, and/or passive electronic components may be used. Thus, for example, the processor 702, the user input interface 704, the display interface 706, the feature analyzer 708, the comparator 710, the memory 712, and/or the communication interface 714, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The processor 702, the user input interface 704, the display interface 706, the feature analyzer 708, the comparator 710, the memory 712, and/or the communication interface 714, or parts thereof, may be implemented using instructions, code, and/or other software and/or firmware, etc. stored on a machine-accessible medium or computer-readable medium (e.g., the memory 712 of FIG. 7 and/or a memory 808 of FIG. 8) and executable by, for example, a processor (e.g., the example processor 702 of FIG. 7 and/or a processor 802 of FIG. 8). When any of the appended claims are read to cover a purely software implementation, at least one of the processor 702, the user input interface 704, the display interface 706, the feature analyzer 708, the comparator 710, the memory 712, or the communication interface 714 is hereby expressly defined to include a tangible medium such as a solid state memory, a magnetic memory, a digital versatile disk (DVD), a compact disk (CD), etc.

Turning in detail to FIG. 7, the apparatus 700 of the illustrated example is provided with the example processor 702 to control and/or manage operations of the user device 102 of FIGS. 1-3. In the illustrated example, the processor 702 receives information from one or more of the user input interface 704, the feature analyzer 708, the comparator 710, the memory 712, and/or the communication interface 714 and makes decisions and facilitates information exchange internal and external to the user device 102.

To receive user input, the apparatus 700 is provided with the example user input interface 704. In the illustrated example, the user input interface 704 is to be connected to one or more input devices (e.g., a keyboard 816, a touchscreen, and/or a microphone 820 of FIG. 8) to enable interactivity between a user and the user device 102. To display information or display elements, the apparatus is provided with the example display interface 706. In the illustrated example, the display interface 706 is to be connected to a display such as an example display 810 of FIG. 8.

To analyze audio segments (e.g., one or more of the audio segments 110, 400, 500, and/or 600 of FIGS. 1 and 4-6), the example apparatus 700 is provided with the example feature analyzer 708. The feature analyzer 708 of the illustrated example analyzes audio segments to detect and recognize information located therein. For example, if the IVR audio segment 110 of FIG. 1 is implemented using the audio segment 400 of FIG. 4, the feature analyzer 708 is provided with speech recognition capabilities. For examples in which the IVR audio segment 110 of FIG. 1 is implemented using the audio segment 500 of FIG. 5, the feature analyzer 708 is provided with capabilities to detect affixed information such as the human-imperceptible affixed information 504 of FIG. 5. For examples in which the IVR audio segment 110 of FIG. 1 is implemented using the audio segment 600 of FIG. 6, the feature analyzer 708 is provided with capabilities to detect information embedded, encoded, or otherwise inserted into human-perceptible audio such as the human-imperceptible embedded information 604 embedded in the human-perceptible audio 602.

In some examples, the feature analyzer 708 may be provided with a combination of different types of capabilities suitable to enable the user device 102 to detect information in accordance with the techniques disclosed in any of FIGS. 4-6. In other examples that employ other techniques for transmitting information to the user device 102 instead of or in addition to any one or more of the techniques of FIGS. 4-6, the feature analyzer 708 may be provided with capabilities to detect information in audio segments using any such other techniques. For example, some such other techniques may involve establishing a data connection concurrently with a voice connection between the user device 102 and the IVR voicemail system 104 during the call session connection 106 of FIG. 1. In such examples, the feature analyzer 708 can be configured to monitor information received on the data connection. Such information is similar or identical to the information described as being transmitted in the human-imperceptible affixed information 504 of FIG. 5 and/or the human-imperceptible embedded information 604 of FIG. 6.

To compare information, the apparatus 700 is provided with the example comparator 710. For example, the user device 102 may locally store reference features (e.g., tonal frequency values, text, codes, symbols, etc.) to compare with information retrieved from features (e.g., the speech of FIG. 4, the human-imperceptible affixed information portion 504 of FIG. 5, the human-imperceptible embedded information 604 of FIG. 6) detected in audio segments (e.g., one or more of the audio segments 110, 400, 500, and/or 600 of FIGS. 1 and 4-6) to determine whether the detected features correspond to information that the user device 102 should display in the visual notification and user input area 114 of FIGS. 1-3.

To store data and/or machine-readable or computer-readable instructions, the apparatus 700 is provided with the example memory 712. The memory 712 of the illustrated example is implemented using the memory 808 of FIG. 8. However, in other examples, the memory 712 may be implemented using any other solid state, magnetic, or optical memory. In the illustrated example, the memory 712 is shown as storing a user controls library or data structure 716 and a notifications library or data structure 718. The user controls library 716 of the illustrated example stores graphical user interface controls (e.g., the user control prompts 202a-d of FIG. 2 and/or 304a-b of FIG. 3) for displaying in the visual notification and user input area 114. The notifications library 718 of the illustrated example stores pre-defined notifications such as confirmation messages (e.g., the visual notification 302 of FIG. 3) or voicemail account status indications for displaying in the visual notification and user input area 114. In the illustrated example, libraries 716 and 718 also store feature references in association with corresponding user controls or pre-defined notifications stored therein. In this manner, the comparator 710 can compare features detected in audio segments (e.g., one or more of the audio segments 110, 400, 500, and/or 600 of FIGS. 1 and 4-6) with feature references in the libraries 716 and 718 to determine which stored user control(s) and/or notification(s) should be displayed in the visual notification and user input area 114.

In some examples, user controls stored in the user controls library 716 and pre-defined notifications stored in the notifications library 718 may be selected or specified by telecommunications carriers or operators that provide subscriber services for user devices (e.g., the user device 102 of FIGS. 1-3). Additionally or alternatively, the user controls and pre-defined notifications stored in the libraries 716 and 718 may be selected or specified by device manufacturers that manufacture such user devices.

To exchange information or communicate with the IVR voicemail system 104 of FIG. 1, the apparatus 700 is provided with the communication interface 714. In the illustrated example, the communication interface 714 enables telephony communications via wired and/or wireless communication media. In some examples, the communication interface 714 also enables receiving and sending data via data channels. The communication interface 714 of the illustrated example may be implemented using any suitable type of telecommunication interface to enable establishing the call session connection 106 of FIG. 1. Such example telecommunication interfaces may include a POTS interface, a wireless cellular interface, a VoIP interface, a public switched telephone network (PSTN) interface, a public land mobile network (PLMN) interface, and/or any other type of interface, and/or any combination thereof.

Figure 8:
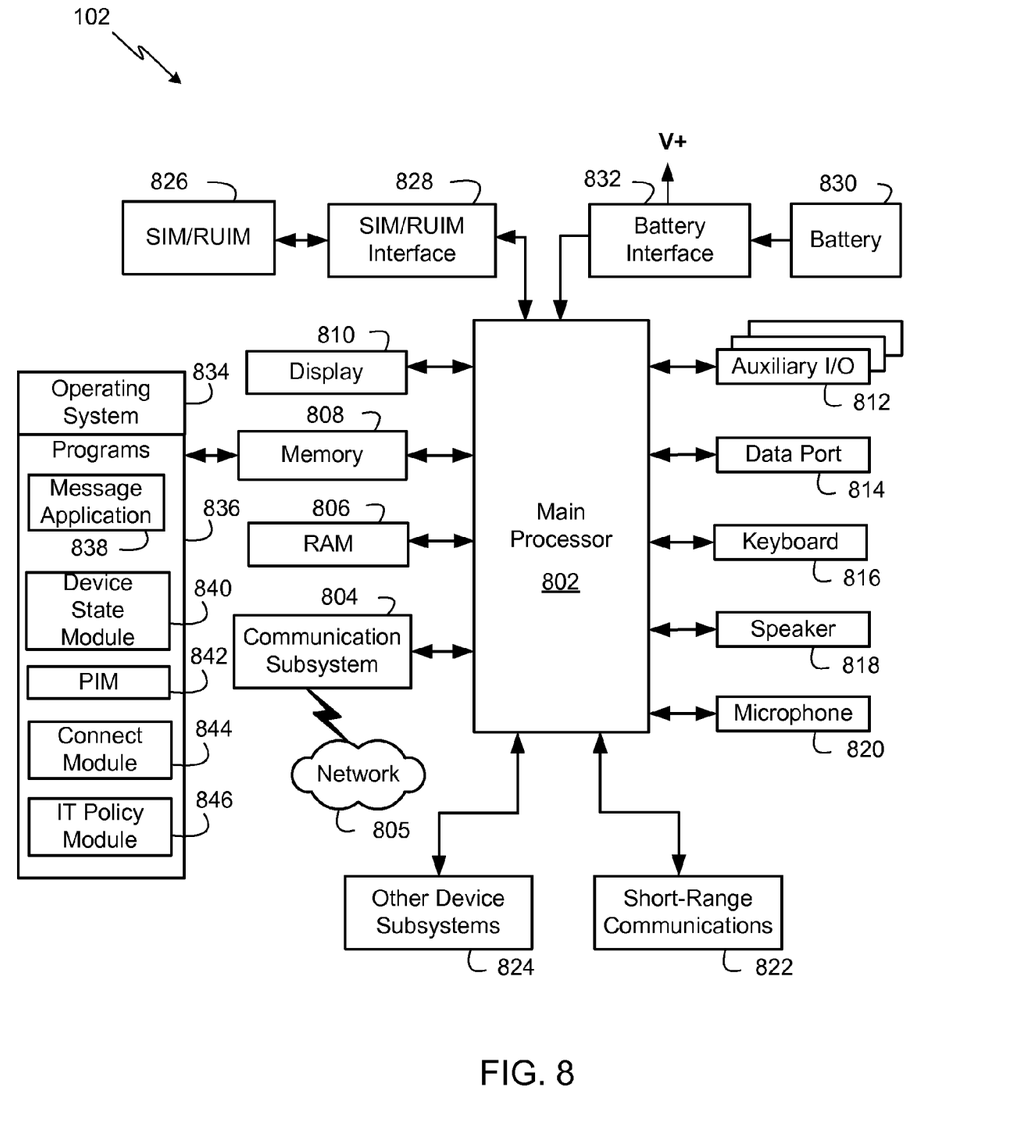
FIG. 8 depicts an example block diagram of a mobile device that may be used to implement an example user device of FIGS. 1-3 and/or the example apparatus of FIG. 7.

FIG. 8 depicts a block diagram of an example implementation of a processor system that may be used to implement a mobile device such as the user device 102 of FIGS. 1-3. In the illustrated example, the user device 102 is a two-way communication device with advanced data communication capabilities including the capability to communicate with other wireless-enabled devices or computer systems through a network of transceiver stations. In the illustrated example, the user device 102 also has the capability to allow voice communication. Depending on the functionality provided by the user device 102, it may be referred to as a data messaging device, a two-way pager, a cellular telephone with data messaging capabilities, a smart phone, a wireless Internet appliance, and/or a data communication device (with or without telephony capabilities). To aid the reader in understanding the structure of the user device 102 and how it communicates with other devices and host systems, FIG. 8 will now be described in detail.

Referring to FIG. 8, the user device 102 includes a number of components such as a main processor 802 that controls the overall operation of the user device 102. Communication functions, including data and voice communications, are performed through a communication subsystem 804. The communication subsystem 804 receives messages from and sends messages to a wireless network 805. In the illustrated example of the user device 102, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example implementations described herein are intended to use any other suitable standards that are developed in the future. The wireless link connecting the communication subsystem 804 with the wireless network 805 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 805 associated with the user device 102 is a GSM/GPRS wireless network in one example implementation, other wireless networks may also be associated with the user device 102 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, MOBITEX® and DATATAC® network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, the persistent memory 808 (e.g., a non-volatile memory), the display 810, an auxiliary input/output (I/O) subsystem 812, a data port 814, the keyboard 816, a speaker 818, the microphone 820, short-range communications 822, and other device subsystems 824.

Some of the subsystems of the user device 102 perform communication-related functions, whereas other subsystems may provide "resident" or on-device functions. By way of example, the display 810 and the keyboard 816 may be used for both communication-related functions, such as entering a text message for transmission over the network 805, and device-resident functions such as a calculator or task list.

The user device 102 can send and receive communication signals over the wireless network 805 after required network registration or activation procedures have been completed. Network access is associated with a subscriber or user of the user device 102. To identify a subscriber, the user device 102 allows a SIM/RUIM card 826 (i.e., Subscriber Identity Module or a Removable User Identity Module) to be inserted into a SIM/RUIM interface 828 to communicate with a network. The SIM card or RUIM 826 is one type of a conventional "smart card" that can be used to identify a subscriber of the user device 102 and to personalize the user device 102, among other things. In some examples, without the SIM card 826, the user device 102 is not fully operational for communication with the wireless network 805. By inserting the SIM card/RUIM 826 into the SIM/RUIM interface 828, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (I MSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the persistent memory 808.

The user device 102 is a battery-powered device and includes a battery interface 832 for receiving one or more rechargeable batteries 830, which may be replaceable or non-replaceable. In at least some embodiments, the battery 830 can be a smart battery with an embedded microprocessor. The battery interface 832 is coupled to a regulator (not shown), which assists the battery 830 in providing power V+ to the user device 102. Although current technology makes use of a battery, future technologies such as micro fuel cells, solar cells, etc. may provide the power to the user device 102.

The user device 102 also includes an operating system 834 and software components 836 to 846 which are described in more detail below. The operating system 834 and the software components 836 to 846 that are executed by the main processor 802 are typically stored in a persistent store such as the persistent memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the user device 102 during its manufacture. Other software applications include a message application 838 that can be any suitable software program that allows a user of the user device 102 to send and receive electronic messages. Various alternatives exist for the message application 838 as is well known to those skilled in the art. Messages that have been sent or received by the user are typically stored in the persistent memory 808 of the user device 102 or some other suitable storage element in the user device 102. In at least some embodiments, some of the sent and received messages may be stored remotely from the user device 102 such as in a data store of an associated host system with which the user device 102 communicates.

The software applications can further include a device state module 840, a Personal Information Manager (PIM) 842, and other suitable modules (not shown). The device state module 840 provides persistence (i.e., the device state module 840 ensures that important device data is stored in persistent memory, such as the persistent memory 808, so that the data is not lost when the user device 102 is turned off or loses power).

The PIM 842 includes functionality for organizing and managing data items of interest to the user, such as, but not limited to, e-mail, contacts, calendar events, voice mails, appointments, and task items. A PIM application has the ability to send and receive data items via the wireless network 805. PIM data items may be seamlessly integrated, synchronized, and updated via the wireless network 805 with the mobile device subscriber's corresponding data items stored and/or associated with a host computer system. This functionality creates a mirrored host computer on the user device 102 with respect to such items. This can be particularly advantageous when the host computer system is the mobile device subscriber's office computer system.

The user device 102 also includes a connect module 844, and an IT policy module 846. The connect module 844 implements the communication protocols used by the mobile device 108 to communicate with the wireless infrastructure and any host system, such as an enterprise system, with which the user device 102 is authorized to interface.

The connect module 844 includes a set of APIs that can be integrated with the user device 102 to allow the user device 102 to use any number of services associated with the enterprise system. The connect module 844 allows the user device 102 to establish an end-to-end secure, authenticated communication pipe with the host system. A subset of applications for which access is provided by the connect module 844 can be used to pass IT policy commands from the host system (e.g., from an IT policy server of a host system) to the user device 102. This can be done in a wireless or wired manner. These instructions can then be passed to the IT policy module 846 to modify the configuration of the mobile device 102. Alternatively, in some cases, the IT policy update can also be done over a wired connection. The IT policy module 846 receives IT policy data that encodes the IT policy. The IT policy module 846 then ensures that the IT policy data is authenticated by the user device 102. The IT policy data can then be stored in the flash memory 806 in its native form.

Other types of software applications can also be installed on the user device 102. These software applications can be third party applications, which are added after the manufacture of the user device 102. Examples of third party applications include games, calculators, utilities, etc.

The additional applications can be loaded onto the user device 102 through at least one of the wireless network 805, the auxiliary I/O subsystem 812, the data port 814, the short-range communications subsystem 822, or any other suitable device subsystem 824. This flexibility in application installation increases the functionality of the user device 102 and may provide enhanced on-device functions, communication-related functions, or both. For example, secure communication applications may enable electronic commerce functions and other such financial transactions to be performed using the user device 102.

The data port 814 enables a subscriber to set preferences through an external device or software application and extends the capabilities of the user device 102 by providing for information or software downloads to the user device 102 other than through a wireless communication network. The alternate download path may, for example, be used to load an encryption key onto the user device 102 through a direct and thus reliable and trusted connection to provide secure device communication.

The data port 814 can be any suitable port that enables data communication between the user device 102 and another computing device. The data port 814 can be a serial or a parallel port. In some instances, the data port 814 can be a USB port that includes data lines for data transfer and a supply line that can provide a charging current to charge the battery 830 of the user device 102.

The short-range communications subsystem 822 provides for communication between the user device 102 and different systems or devices, without the use of the wireless network 805. For example, the subsystem 822 may include an infrared device and associated circuits and components for short-range communication. Examples of short-range communication standards include standards developed by the Infrared Data Association (IrDA), a Bluetooth® communication standard, and the 802.11 family of standards developed by IEEE.

In use, a received signal such as a text message, an e-mail message, a web page download, media content, etc. will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad, and may be either a physical keyboard or a touch screen keyboard. However, other types of keyboards may also be used. A composed item may be transmitted over the wireless network 805 through the communication subsystem 804.

For voice communications, the overall operation of the user device 102 is substantially similar, except that the received signals are output to the speaker 818, and signals for transmission are generated by the microphone 820. Alternative voice or audio I/O subsystems, such as a voice message recording subsystem, can also be implemented on the user device 102. Although voice or audio signal output is accomplished primarily through the speaker 818, the display 810 can also be used to provide additional information such as the identity of a calling party, duration of a voice call, or other voice call related information.

FIGS. 9-12 depict example flow diagrams representative of processes that may be implemented using, for example, computer-readable instructions stored on a computer-readable medium to facilitate voicemail interactions based on detecting features in transmissions from the IVR voicemail system 104 of FIG. 1. The example processes of FIGS. 9-12 may be performed using one or more processors, controllers, and/or any other suitable processing devices. For example, the example processes of FIG. 9-12 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 9-12 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer-readable medium and non-transitory machine-accessible medium are expressly defined to include any type of computer-readable medium or machine-accessible medium and to exclude propagating signals.

Alternatively, some or all operations of the example processes of FIGS. 9-12 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example processes of FIGS. 9-12 may be implemented manually or as any combination(s) of any of the foregoing techniques, for example, any combination of firmware, software, discrete logic and/or hardware. Further, although the example processes of FIGS. 9-12 are described with reference to the flow diagrams of FIGS. 9-12, other methods of implementing the processes of FIGS. 9-12 may be employed. For example, the order of execution of the blocks may be changed, and/or some of the blocks described may be changed, eliminated, sub-divided, or combined. Additionally, any or all operations of the example processes of FIGS. 9-12 may be performed sequentially and/or in parallel by, for example, separate processing threads, processors, devices, discrete logic, circuits, etc.

In the illustrated example, the processes of FIGS. 9-12 are described below as performed by the user device 102 of FIGS. 1-3 as implemented using the example apparatus 700 of FIG. 7. However, the example processes of FIGS. 9-12 may additionally or alternatively be implemented using any other suitable device or apparatus.

Figure 9:
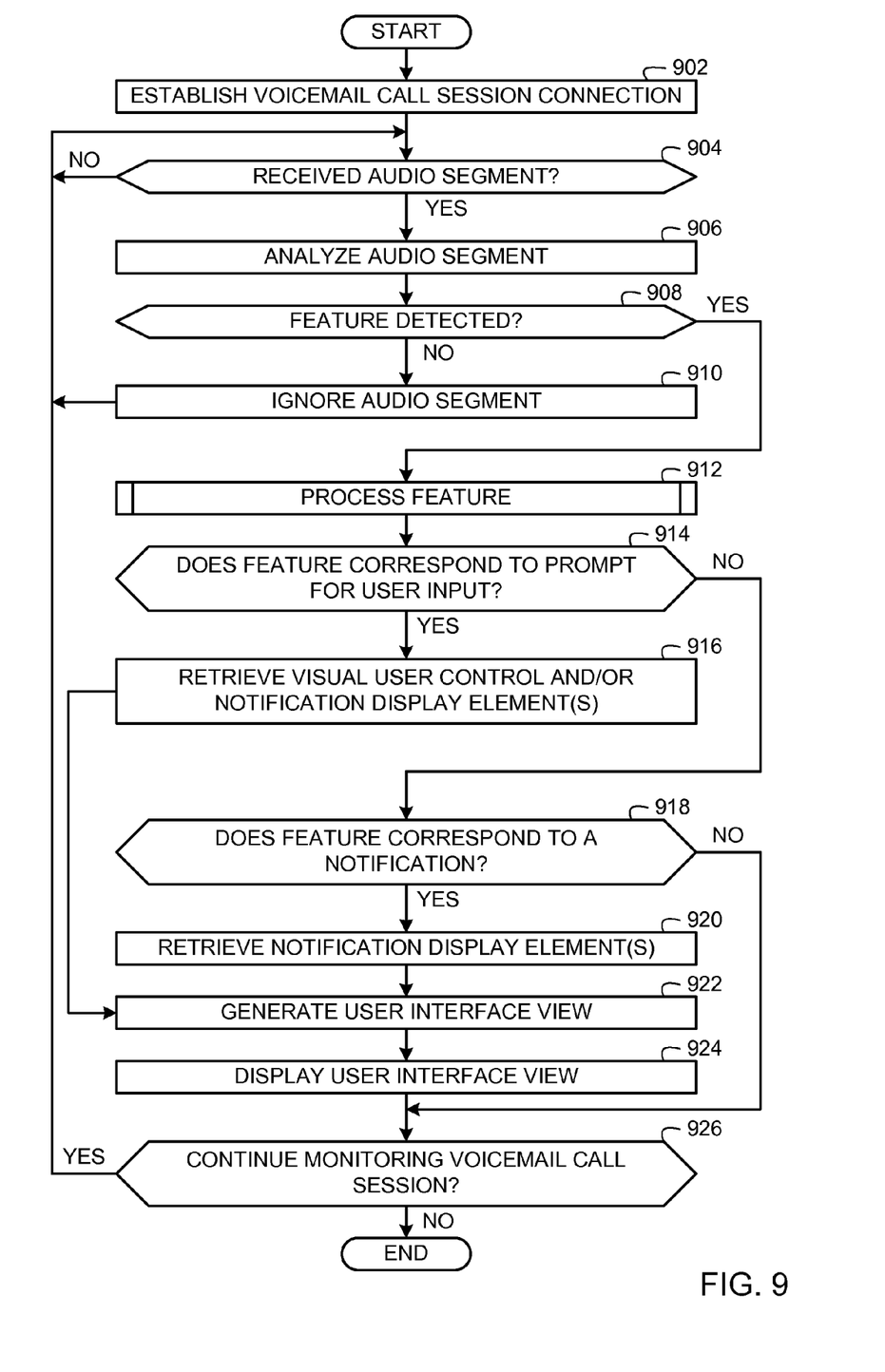
FIG. 9 depicts an example flow diagram representative of computer readable instructions that may be used to facilitate voicemail interactions based on detecting features in transmissions from the IVR voicemail system of FIG. 1.

Now turning in detail to FIG. 9, initially, the communication interface 714 (FIG. 7) establishes the voicemail call session connection 100 of FIG. 1 (block 902). The communication interface 714 determines whether it has received an audio segment (e.g., the IVR audio segment 110 of FIG. 1) (block 904). If the communication interface 714 has not received an audio segment, control remains at block 904 until an audio segment has been received. Otherwise, if the communication interface 714 has received the IVR audio segment 110, the feature analyzer 708 (FIG. 7) analyzes the IVR audio segment 110 (block 906) and determines whether it has detected a feature in the IVR audio segment 110 (block 908). In some examples, the feature is recognizable speech as discussed above in connection with the audio segment 400 of FIG. 4. In other examples, the feature is the human-imperceptible affixed information 504 of the audio segment 500 of FIG. 5. In yet other examples, the feature is the human-imperceptible embedded information 604 of the audio segment 600 of FIG. 6.

If the feature analyzer 708 does not detect a feature at block 908, the apparatus 700 ignores the audio segment (block 910), and control returns to block 904 until another audio segment is received. If the feature analyzer 708 does detect a feature at block 908, control advances to block 912 at which the feature analyzer 708 processes the detected feature. Example processes that may be used to implement the operation of block 912 are described below in connection with FIGS. 10-12.

After the feature is processed at block 912, the comparator 710 (FIG. 7) determines whether the feature corresponds to a prompt for user input (block 914). For example, the comparator 710 can compare the feature (or information in the feature) with reference features stored in the user controls library 716 and the notifications library 718 of FIG. 7 to determine a corresponding action for displaying information in the visual notification and user input area 114. In this manner, if the comparator 710 finds, at block 914, a user control and/or notification corresponding to a prompt for user input based on the detected feature, the display interface 706 (FIG. 7) retrieves the corresponding user control and/or notification text/information and/or graphic display element(s) for display from the user controls library 716 and/or the notifications library 718 (block 916). For example, a user-selectable user control may be displayed to enable a user to select the user control to request a particular operation and/or a notification may be displayed to inform a user of which keypad key to press to request a particular operation. After retrieving the user control and/or notification at block 916, control advances to block 922.

If the comparator 710 determines, at block 914, that the feature does not correspond to a prompt for user input, control advances to block 918 at which the comparator 710 determines whether the feature corresponds to a notification (block 918). For example, the comparator 710 can compare the feature (or information in the feature) with reference features stored in the notifications library 718 of FIG. 7 to determine a corresponding action for displaying information in the visual notification and user input area 114. If the comparator 710 determines, at block 918, that the detected feature does not correspond to a notification, control advances to block 926. However, if the comparator 710 finds, at block 918, a notification corresponding to the detected feature, the display interface 706 (FIG. 7) retrieves the corresponding notification text/information and/or graphic display element(s) for display from the notifications library 718 (block 920).

In examples in which the feature is recognizable speech (e.g., as discussed above in connection with FIG. 4) that the user device 102 converts into text format to display the converted text in the visual notification and user input area 114, the operation of block 916 and/or the operation of block 920 may be skipped. That is, in such examples the display interface 706 displays the converted text in the visual notification and user input area 114 instead of retrieving and displaying display elements or display information from the libraries 716 and 718.

After the display interface 706 retrieves a user control and/or a notification text/information and/or graphic display element(s) at block 916 or retrieves a notification text/information and/or graphic display element(s) at block 920, the display interface 706 generates a user interface view (block 922) to present the retrieved display element(s) or display information. Example user interface views that may be generated by the display interface 706 are shown in the visual notification and user input area 114 of FIGS. 2 and 3. The display interface 706 then displays the user interface view (block 924) with the display element(s) or display information in the visual notification and user input area 114 (FIGS. 1-3) via, for example, the display 810 of FIG. 8.

The processor 702 (FIG. 7) determines whether to continue monitoring the voicemail call session 100 via the call session connection 106 of FIG. 1 (block 926). For example, if the voicemail call session 100 has not ended, control returns to block 904 to continue to monitor the voicemail call session 100. Otherwise, if the voicemail call session 100 has ended, the processor 702 determines that the user device 102 is not to continue monitoring the voicemail call session 100 (block 926), and the example process of FIG. 9 ends.

Although blocks 904, 906, 908, 910, and 912 are described above as being performed in connection with an audio segment (e.g., one of the IVR audio segment 110 of FIG. 1 and/or the audio segments 400, 500, and 600 of FIGS. 4-6), in other examples in which detectable feature information is received at the user device 102 via data connections, operations of the blocks 904, 906, 908, 910, and 912 may be performed on data received at the user device 102 via data segments over the data connection rather than on audio segments received via an audio connection.

Figure 10:
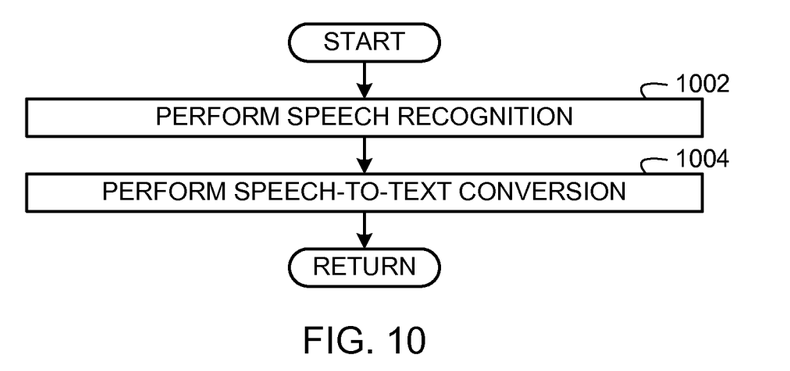
FIG. 10 depicts an example flow diagram representative of computer-readable instructions that may be used to perform speech recognition on audio segments in connection with the example flow diagram of FIG. 9.

Turning now to FIG. 10, an illustrated example flow diagram is representative of computer-readable instructions that may be used to perform speech recognition on audio segments (e.g., the audio segment 110 of FIG. 1 and/or the audio segment 400 of FIG. 4) in connection with the example flow diagram of FIG. 9. In the illustrated example, the example process of FIG. 10 may be used to implement the operation of block 912 of FIG. 9 and is described in connection with the audio segment 400 of FIG. 4. To process information in a detected feature (e.g., the feature detected at block 908 of FIG. 9) in accordance with the example process of FIG. 10, the feature analyzer 708 (FIG. 7) performs a speech recognition process on a voice signal or voice portion (e.g., the detected feature) of the audio segment 400 of FIG. 4 (block 1002). The feature analyzer 708 then performs a speech-to-text conversion based on the results of the speech recognition process (block 1004). Control then returns to a calling function or process such as the example process of FIG. 9, and the example process of FIG. 10 ends.

Figure 11:
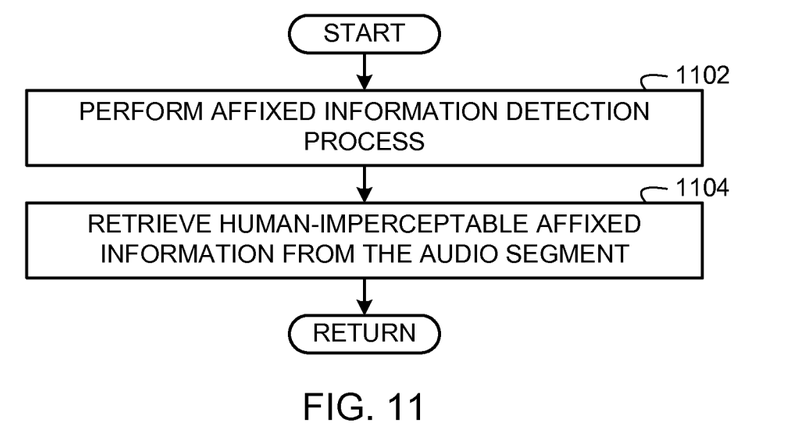
FIG. 11 depicts an example flow diagram representative of computer-readable instructions that may be used to retrieve information from human-imperceptible affixed signals in audio segments in connection with the example flow diagram of FIG. 9.

FIG. 11 depicts an example flow diagram representative of computer-readable instructions that may be used to retrieve information from human-imperceptible affixed signals (e.g., the human-imperceptible affixed information 504 of FIG. 5) in audio segments (e.g., the audio segment 110 of FIG. 1 and/or the audio segment 500 of FIG. 5) in connection with the example flow diagram of FIG. 9. In the illustrated example, the example process of FIG. 11 may be used to implement the operation of block 912 of FIG. 9 and is described in connection with the audio segment 500 of FIG. 5. To process information in a detected feature (e.g., the feature detected at block 908 of FIG. 9) in accordance with the example process of FIG. 11, the feature analyzer 708 (FIG. 7) performs an affixed information detection process on the audio segment 500 of FIG. 5 (block 1102) to detect the location of the human-imperceptible affixed information 504 in the audio segment 500. The feature analyzer 708 then retrieves the human-imperceptible affixed information 504 from the audio segment 500 (block 1104). Control then returns to a calling function or process such as the example process of FIG. 9, and the example process of FIG. 11 ends.

Figure 12:
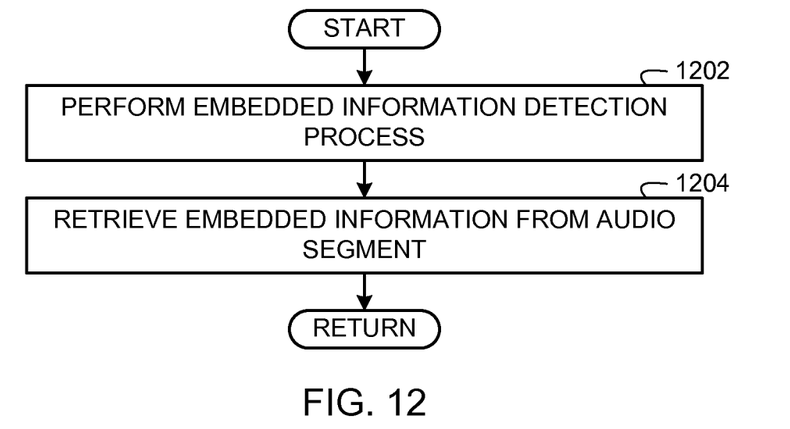
FIG. 12 depicts an example flow diagram representative of computer-readable instructions that may be used to retrieve embedded information from audio segments in connection with the example flow diagram of FIG. 9.

FIG. 12 depicts an example flow diagram representative of computer-readable instructions that may be used to retrieve embedded information (e.g., the human-perceptible embedded information 604 of FIG. 6) from audio segments (e.g., the audio segment 110 of FIG. 1 and/or the audio segment 600 of FIG. 6) in connection with the example flow diagram of FIG. 9. In the illustrated example, the example process of FIG. 12 may be used to implement the operation of block 912 of FIG. 9 and is described in connection with the audio segment 600 of FIG. 6. To process information in a detected feature (e.g., the feature detected at block 908 of FIG. 9) in accordance with the example process of FIG. 12, the feature analyzer 708 (FIG. 7) performs an embedded information detection process on the audio segment 600 of FIG. 6 (block 1202) to detect the location of the human-imperceptible embedded information 604 in the audio segment 600. The feature analyzer 708 then retrieves the human-imperceptible embedded information 604 from the audio segment 600 (block 1204). Control then returns to a calling function or process such as the example process of FIG. 9, and the example process of FIG. 12 ends.

In some examples disclosed herein, an example method to facilitate voicemail interaction involves, during a call session with a voicemail system, receiving an audio segment from the voicemail system. Feature recognition is performed on the audio segment. A display element is output to a user interface based on a recognized feature in the audio segment. Such examples enable users to conduct voicemail system interactions using visual information displayed on a user device. Some disclosed examples substantially reduce the need for repeated back and forth movement of a user device between a user's ear and the user's visual space by reducing the number of times that the user must put the user device to his/her ear to listen to audio prompts, move the user device away from his/her ear to press a key for a desired action (e.g., delete, save, forward, send, skip, create, etc. a voicemail message), and move the user device back to his/her ear to listen for an audio notification or confirmation that the desired action has occurred. Such back and forth movement between a user's ear and the user's view of the user device may otherwise be time consuming, tedious, and cumbersome when navigating a voicemail call session. For example, such back and forth movement introduces discontinuities in a user's visual focus on a user device keypad or touch-screen display such that each time a user moves the user device back into viewing position, the user must refocus and re-orient his/her sight on the user device keypad or touch-screen display. Similarly, each time the user moves the user device back to his/her ear, the user must re-position the device for optimal comfort and hearing. As such, some examples disclosed herein advantageously improve user experience during voicemail interaction by providing relatively better continuity between a user providing input to a voicemail system and the user receiving feedback or confirmations from the voicemail system.

Some examples disclosed herein advantageously reduce the need for users to rely solely on hearing and remembering audio information (e.g., prompts, notifications, confirmations, etc.) during a voicemail call session. In this manner, if a user is involved in a voicemail call session while in a noisy environment, examples disclosed herein enable the user to receive visual information (e.g., prompts, notifications, confirmations, etc.) that would otherwise be available only via audio information from the voicemail system. Such receipt of information in a visual manner may advantageously reduce or eliminate confusion and increase user-understanding or clarity as to which keys to press for different features or operations (e.g., delete, save, forward, send, skip, create, etc. a voicemail message). Such example advantages may substantially reduce or eliminate user-frustration and potentially risky scenarios (e.g., initiating a delete operation when a save operation was intended) that could otherwise occur using prior art voicemail systems if a person incorrectly hears or mis-interprets received audio information.

Although certain methods, apparatus, and articles of manufacture have been disclosed herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to facilitate voicemail interaction, comprising:
   during a call session with a voicemail system, receiving an audio segment at a user device from the voicemail system;
   performing feature recognition on the audio segment at the user device during the call session by detecting human imperceptible information embedded in the audio segment; and
   outputting a display element to a user interface of the user device during the call session based on a recognized feature in the audio segment, after a comparator determines that the display element corresponds to the audio segment.

2. A method as defined in claim 1, wherein performing the feature recognition comprises:
   performing speech recognition on a voice portion of the audio segment; and
   recognizing one or more words of the voice portion.

3. A method as defined in claim 1, wherein the display element is a user interface control to control the voicemail system to at least one of send a message, skip a message, and delete a message.

4. A method as defined in claim 1, wherein the human-imperceptible information is at least one of text and a code modulated for transmission over voice communications.

5. A method as defined in claim 1, wherein performing the feature recognition comprises detecting human-imperceptible affixed information that is one of:
   affixed to a voice portion of the audio segment; and
   received in one of the audio segment and another audio segment subsequent to or preceding the audio segment.

6. A method as defined in claim 1, wherein the display element is one of a graphical user interface control, a notification confirming completion of a user-requested operation, and a notification requesting user-initiation of a user-requested operation.

7. A method as defined in claim 1, wherein the user device is a telephony-capable mobile device.

8. An apparatus to facilitate voicemail interaction, comprising:
   a communication interface operable to, during a call session with a voicemail system, receive an audio segment from the voicemail system;
   a feature analyzer operable to perform feature recognition on the audio segment by detecting human imperceptible information embedded in the audio segment;
   a user interface having at least one user interface control; and
   a display interface operable to output the user interface control to the user interface based on a recognized feature in the audio segment, after a comparator determines that the display element corresponds to the audio segment, the user interface control operable to control the voicemail system.

9. An apparatus as defined in claim 8, wherein the feature analyzer is operable to perform the feature recognition by:
   performing speech recognition on a voice portion of the audio segment; and
   recognizing one or more words of the voice portion.

10. An apparatus as defined in claim 9, wherein the one or more words comprise at least one option to control the voicemail system, the at least one option presented as the user interface control is operable to perform at least one of sending a message, skipping a message, or deleting a message.

11. An apparatus as defined in claim 9, wherein the human-imperceptible information is at least one of text and a code modulated for transmission over voice communications.

12. An apparatus as defined in claim 8, wherein the feature analyzer is operable to perform the feature recognition by detecting human-imperceptible affixed information that is one of:
   affixed to a voice portion of the audio segment; and
   received in one of the audio segment and another audio segment subsequent to or preceding the audio segment.

13. An apparatus as defined in claim 8, wherein the information is one of a graphical user interface control and a notification confirming the completion of a user-requested operation.

14. An apparatus as defined in claim 8, wherein the apparatus is a telephony-capable mobile device.

15. A machine-accessible storage medium having instructions stored thereon that, when executed, cause a processor of a user device to at least:
   during a call session with a voicemail system, receive an audio segment from the voicemail system;

perform feature recognition on the audio segment during the call session by detecting human imperceptible information embedded in the audio segment; and output a display element to a user interface of the user device during the call session based on a recognized feature in the audio segment, after a comparator determines that the display element corresponds to the audio segment.

16. A machine-accessible medium as defined in claim 15 having instructions stored thereon that, when executed, cause the processor to perform the feature recognition by:

performing speech recognition on a voice portion of the audio segment; and recognizing one or more words of the voice portion.

17. A machine-accessible medium as defined in claim 15, wherein the display element is one of a graphical user interface control, a notification confirming selection of a user-requested operation, and a notification confirming completion of a user-requested operation.

* * * * *